US012613425B2

(12) United States Patent
Salmimaa et al.

(10) Patent No.: US 12,613,425 B2
(45) Date of Patent: Apr. 28, 2026

(54) OPTICAL APPARATUS, MODULE AND DEVICE

(71) Applicant: Nokia Technologies Oy, Espoo (FI)

(72) Inventors: Marja Salmimaa, Tampere (FI); Toni Jarvenpaa, Akaa (FI)

(73) Assignee: Nokia Technologies Oy, Espoo (FI)

( * ) Notice: Subject to any disclaimer, the term of this patent is extended or adjusted under 35 U.S.C. 154(b) by 325 days.

(21) Appl. No.: 18/035,140

(22) PCT Filed: Oct. 27, 2021

(86) PCT No.: PCT/EP2021/079805
§ 371 (c)(1),
(2) Date: May 3, 2023

(87) PCT Pub. No.: WO2022/096340
PCT Pub. Date: May 12, 2022

(65) Prior Publication Data
US 2023/0408834 A1      Dec. 21, 2023

(30) Foreign Application Priority Data

Nov. 6, 2020    (EP) ..................................... 20206182

(51) Int. Cl.
*G02B 27/10*          (2006.01)
*F21V 8/00*          (2006.01)
*G02B 27/00*          (2006.01)

(52) U.S. Cl.
CPC ....... *G02B 27/1066* (2013.01); *G02B 6/0016* (2013.01); *G02B 6/0018* (2013.01); *G02B 6/0038* (2013.01); *G02B 6/0076* (2013.01);

*G02B 6/0088* (2013.01); *G02B 27/0081* (2013.01); *G02B 27/1086* (2013.01)

(58) Field of Classification Search
None
See application file for complete search history.

(56) References Cited

U.S. PATENT DOCUMENTS

2006/0221448 A1    10/2006  Nivon et al. ................... 359/572
2013/0250207 A1*   9/2013   Bohn ................. G02B 27/0172
                                                                372/50.11
2018/0267312 A1*   9/2018   Melli ...................... G02B 5/003
2019/0179149 A1*   6/2019   Curtis ................. G02B 6/0076
2019/0227317 A1*   7/2019   Trail .................. G03B 21/2033
2019/0287495 A1*   9/2019   Mathur ................... G06F 3/011
2022/0137417 A1     5/2022  Bhargava et al.

* cited by examiner

*Primary Examiner* — Shan Liu
(74) *Attorney, Agent, or Firm* — McCarter & English, LLP

(57) ABSTRACT

An apparatus for controlling brightness of images includes: a first light guide including an in-coupling diffraction grating configured to in-couple input beams of light from a first light engine, an expanding grating configured to expand the input beams of light, and an out-coupling diffraction grating configured to out-couple the expanded beams of light; and a second light guide including at least; an in-coupling diffraction grating configured to in-couple input beams of light from a second light engine, an expanding grating configured to expand the input beams of light, and an out-coupling diffraction grating configured to out-couple the expanded beams of light. The out-coupling diffraction grating of the first light guide at least partially overlaps the out-coupling diffraction grating of the second light guide so that images are overlaid to control brightness of images provided by the apparatus.

16 Claims, 8 Drawing Sheets

705

=

R

G

703

+

G

R

701

OPTICAL APPARATUS, MODULE AND DEVICE

CROSS REFERENCE TO RELATED APPLICATION

This patent application is a U.S. National Stage application of International Patent Application Number PCT/EP2021/079805 filed Oct. 27, 2021, which is hereby incorporated by reference in its entirety, and claims priority to EP 20206182.6 filed Nov. 6, 2020.

TECHNOLOGICAL FIELD

Examples of the disclosure relate to optical apparatus, modules and devices. Some relate to optical apparatus, modules and devices for providing images with improved dynamic range.

BACKGROUND

Optical apparatus, such as exit pupil expanders, can be used in display systems and devices such as near eye displays, augmented and/or virtual reality headsets and head up displays for example. Such devices can be used in different light levels, for example they could be used at nighttime or in bright sunlight. Therefore, it is useful to provide a high dynamic range in such devices.

BRIEF SUMMARY

According to various, but not necessarily all, examples of the disclosure there is provided an apparatus comprising:

a first light guiding means comprising at least; in-coupling diffractive means configured to in-couple one or more input beams of light into the first light guiding means from a first light engine, expanding means configured to expand the one or more input beams of light, and out-coupling diffractive means configured to out-couple the one or more expanded beams of light from the first light guiding means; and a second light guiding means comprising at least; in-coupling diffractive means configured to in-couple one or more input beams of light into the second light guiding means from a second light engine, expanding means configured to expand the one or more input beams of light and out-coupling diffractive means configured to out-couple the one or more expanded beams of light from the second light guiding means;

wherein the apparatus is configured so that the out-coupling diffractive means of the first light guiding means at least partially overlaps the out-coupling diffractive means of the second light guiding means so that an image provided by the second light guiding means overlays an image provided by the first light guiding means to control brightness of one or more images provided by the apparatus.

The second light guiding means may be identical to the first light guiding means.

The second light guiding means may be rotated relative to the first light guiding means.

The second light guiding means may be a different size to the first light guiding means.

The second light engine may be turned on to provide an image with increased brightness and turned off to provide an image with non-increased brightness.

The light engines may be configured so that the brightness of the light engines can be controlled to control the brightness of an image provided by the apparatus.

The apparatus may comprise means for automatically adjusting the brightness of an image provided by the apparatus using at least one of; a detected ambient level of illumination, a user indicated preferred brightness level, an importance of the displayed content.

The second light engine may be configured to be operated independently of the first light engine.

The second light engine may be configured to be switched between an on state and an off state while the first light engine remains in an on state.

The second light engine may be configured to provide light in an alternating sequence with the first light engine.

The first light engine may provide an image and the second light engine may provide part of the image so that the addition of the part of the image from the second light guiding means increases the contrast within the image provided by the first light-guiding means.

The part of the image provided by the second light engine may comprise one or more of; text, user interface elements.

The first light guiding means and the second light guiding means may be configured so that the light out-coupled by the different light guiding means is at least partially polarised in the same way.

The apparatus may comprise more than two light-guiding means where each light guiding means comprises at least in-coupling diffractive means configured to in-couple one or more input beams of light into the light guiding means from a light engine, expanding means configured to expand the one or more input beams of light, and out-coupling diffractive means configured to out-couple the one or more expanded beams of light from the light guiding means and wherein each light guiding means may be configured to in-couple light from a different light engine.

According to various, but not necessarily all, examples of the disclosure there is provided a module, a device, a display, a stereoscopic display, an auto stereoscopic display, a head-up display, a display unit of a vehicle and/or a vehicle comprising an apparatus as described herein.

According to various, but not necessarily all, examples of the disclosure there is provided an apparatus comprising:

a first light guiding means comprising at least; in-coupling diffractive means configured to in-couple one or more input beams of light into the first light guiding means from a first light engine, and out-coupling diffractive means configured to out-couple the one or more input beams of light from the first light guiding means; and a second light guiding means comprising at least; in-coupling diffractive means configured to in-couple one or more input beams of light into the second light guiding means from a second light engine, and out-coupling diffractive means configured to out-couple the one or more input beams of light from the second light guiding means;

wherein the apparatus is configured so that the out-coupling diffractive means of the first light guiding means at least partially overlaps the out-coupling diffractive means of the second light guiding means so that an image provided by the second light guiding means overlays an image provided by the first light guiding means to control brightness of one or more images provided by the apparatus.

BRIEF DESCRIPTION

Some examples will now be described with reference to the accompanying drawings in which.

Figure 1:
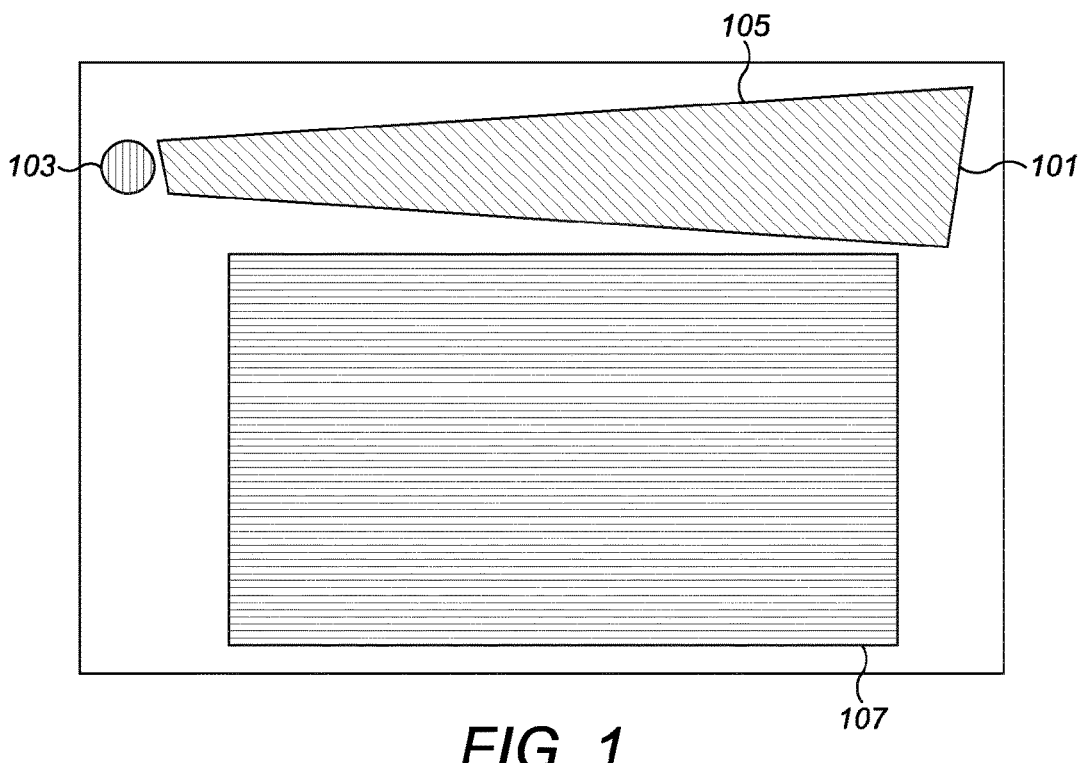
FIG. 1 shows an example exit pupil expander.

The figures are not necessarily to scale. Certain features and views of the figures may be shown schematically or exaggerated in scale in the interest of clarity and conciseness. For example, the dimensions of some elements in the figures can be exaggerated relative to other elements to aid explication. Similar reference numerals are used in the figures to designate similar features. For clarity, all reference numerals are not necessarily displayed in all figures.

DETAILED DESCRIPTION

FIG. 1 shows an example light guiding means 101 that can be used in examples of the disclosure. The light guiding means 101 can be formed on a waveguide, an optical substrate, a transparent plate or any other suitable material.

In this example the light guiding means 101 comprises an exit pupil expander. The exit pupil expander is configured to increase the size of an exit pupil from a light engine or other optical arrangement. The light engine could be a display means such as a projection engine.

The light guiding means 101 comprises in-coupling diffractive means 103, expanding means 105, and out-coupling diffractive means 107.

The in-coupling means 103 comprise any means that is configured to in-couple one or more beams of light from a light engine into the light guiding means 101. The in-coupling means 103 is positioned within the light guiding means 101 so that, in use, the in-coupling means 103 can be positioned adjacent to the light engine.

The in-coupled beam of light travels though the light guiding means 101 via total internal reflection. The refractive index of the material that is used for the light guiding means 101, the wavelength of the in-coupled beam, and the parameters of the in-coupling diffractive means 103 determine the total internal reflection angles.

The expanding means 105 is positioned within the light guiding means 101 so that the in-coupled beam of light is provided from the in-coupling means 103 to the expanding means 105.

The expanding means 105 comprise any means that is configured to expand the in-coupled beam of light in at least one dimension. The expanding means 105 can comprise a diffractive means such as a diffraction grating or any other suitable means. In the diffraction grating the in-coupled beam of light is split into two with every internal reflection. The two split sections of the beam travel in different directions and continue splitting and so expand the exit pupil of the light engine. In the example shown in FIG. 1 the expanding means 105 has a grating which expands the beam in a horizontal direction.

The out-coupling diffractive means 107 is positioned within the light guiding means 101 so that the horizontally expanded beam of light is provided from the expanding means 105 to the out-coupling diffractive means 107.

The out-coupling diffractive means 107 comprises any means that is configured to out-couple the horizontally expanded light beam out of the light guiding means. The out-coupling diffractive means 107 can function in a similar manner to the expanding means 105 so that the expanded beam of light is split into two with every internal reflection. The out-coupling diffractive means 107 can also be configured to expand the horizontally expanded beam of light in a second dimension. In the example shown in FIG. 1 the out-coupling diffractive means 107 has a horizontal grating which expands the horizontally expanded beam in the vertical direction.

The light guiding means 101 is configured so that the out-coupled expanded beam of light can be viewed by a user. The out-coupled expanded beams of light provide a virtual image that can be observed by a user. The out-coupled beam of light therefore provides an expanded exit pupil.

It is to be appreciated that the variations in the size, shape, position, and expansion direction of the different diffractive means are examples and that other variations could be used in other examples of the disclosure. For example, the expanding means 105 could expand the light beam in some other direction than horizontal. As another example, the out-coupling means 107 could expand the beam in some other direction than vertical. As a third example, the exit pupil of the beam of light in-coupled by the in-coupling means 103 would be expanded in the first expansion dimension already prior to in-coupling the beam into the light guiding means 101. In this example there would be no expanding means 105 positioned within the light guiding means 101.

The diffractive means that are used for the in-coupling diffractive means 103, expanding means 105, and out-coupling diffractive means 107 can comprise any means that can be configured to diffract the input beams of light. The diffractive means can comprise any one or more of a diffractive optical element, diffractive structure, diffraction gratings, holographic gratings, Bragg gratings, rulings, ridges, surface relief diffractive gratings or any suitable optical component or feature having a periodic structure that splits and diffracts light into several beams travelling in different directions.

Figure 2:
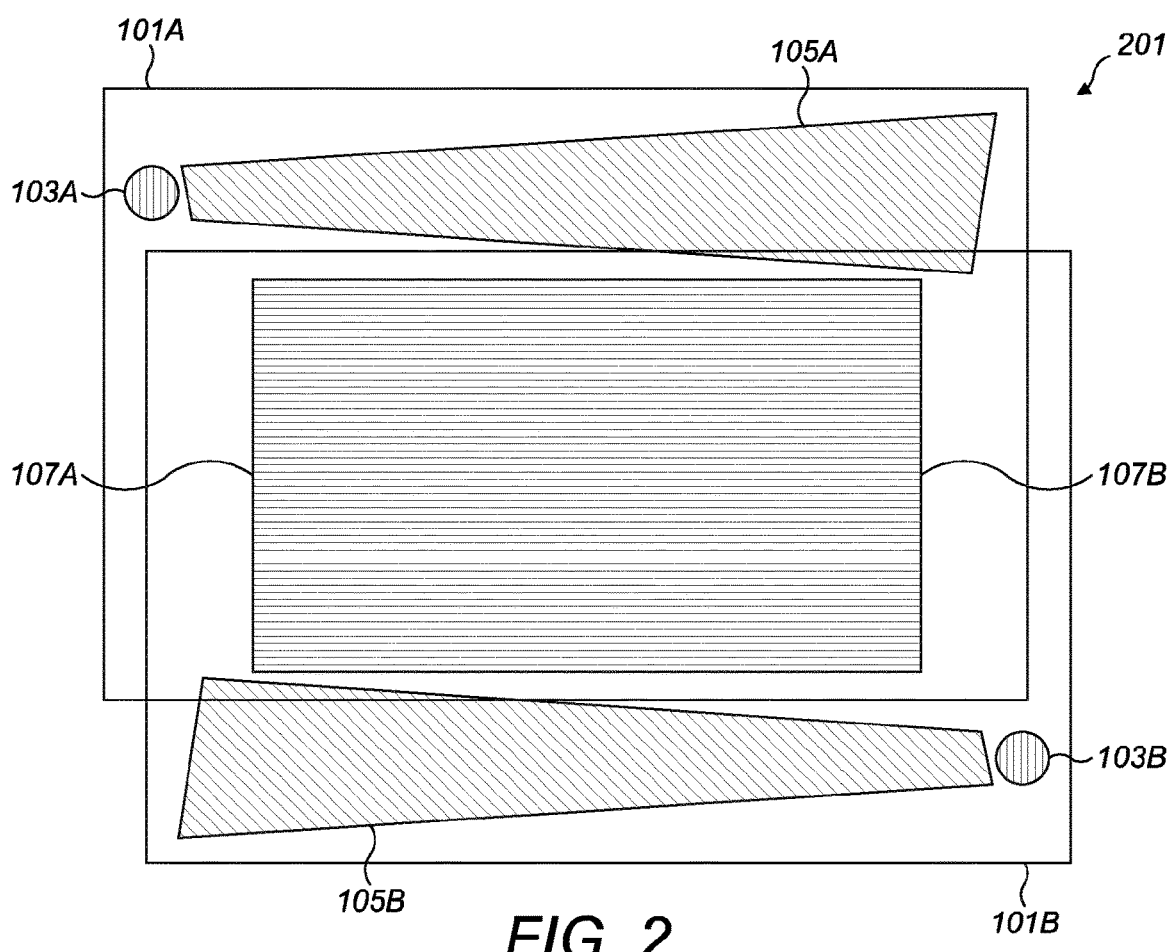
FIG. 2 shows another example apparatus.

FIG. 2 shows an example apparatus 201 that could be used in some examples of the disclosure. The example apparatus 201 could be used in displays such as stereoscopic displays or auto stereoscopic displays. Such displays could be used in devices that provide virtual reality or augmented reality content. In some examples the apparatus 201 could be used in a head up display. The head up display could be used in vehicles or any other suitable apparatus.

The example apparatus 201 shown in FIG. 2 comprises a first light guiding means 101A and a second light guiding means 101B. The first light guiding means 101A and the second light guiding means 101B can comprise an exit pupil expander as shown in FIG. 1 and described above. Corresponding reference numerals are used for corresponding features.

The first light guiding means 101A comprises in-coupling diffractive means 103A configured to in-couple one or more input beams of light into the first light guiding means 101A from a first light engine, expanding means 105A configured to expand the one or more input beams of light, and out-coupling diffractive means 107A configured to out-couple the one or more expanded beams of light from the first light guiding means 101A.

The second light guiding means 101B comprises in-coupling diffractive means 103B configured to in-couple one or more input beams of light into the second light guiding means 101B from a second light engine, expanding means 105B configured to expand the one or more input beams of light, and out-coupling diffractive means 107B configured to out-couple the one or more expanded beams of light from the second light guiding means 101B.

The apparatus 201 is configured so that the first light guiding means 101A is stacked with the second light guiding means 101B. The stacking of the respective light guiding means 101A, 101B positions the first light guiding means 101A relative to the second light guiding means 101B so that the out-coupling diffractive means 107A of the first light guiding means 101A at least partially overlaps the out-coupling diffractive means 107B of the second light guiding means 101B. The overlapping of the respective out-coupling diffractive means 107A, 107B causes an image provided by the second light guiding means 101B to overlay an image provided by the first light guiding means 101A. The images provided by the apparatus 201 can be considered for example as virtual images having focus distance at infinity.

The light engines can be configured so that the image provided by the first light guiding means 101A is the same as the image provided by the second light guiding means 101B. The outcoupling diffractive means 105A, 105B are aligned so that the images that are provided by the first light guiding means 101A are aligned with any images, or parts of images, that are provided by the second light guiding means. When the image from the second light guiding means 101B overlays the image from the first light guiding means 101B this therefore adds to the brightness of the image.

In some examples the light engines can be configured so that the image provided by the second light guiding means 101B is the same as a part of the image provided by the first light guiding means 101A. In such examples the second light guiding means 101B could be configured to provide part of an image representing specific content within the image provided by the first light guiding means 101A. The specific content could be text or user interface elements or any other items that could be designated to have a high level of importance. This can enable the brightness of a part of the image to be controlled independently of the rest of the image.

The brightness of images provided by the apparatus 201 can therefore be controlled by controlling whether or not the second light guiding means 101B is used to provide an image or parts of an image.

In the example apparatus 201 shown in FIG. 2 the second light guiding means 101B is identical to the first light guiding means 101A. The second light guiding means 101B is identical to the first light guiding means 101A in that each of the diffractive components within the second light guiding means 101B has the same size, shape, and diffractive grating spacings as the corresponding components of the first light guiding means 101A. The second light guiding means 101B can be formed from the same material having the same thickness as the first light guiding means 101A. In some examples both the first light guiding means 101A and the second light guiding means 101B could be formed on the same substrate or transparent plate.

In this example the field of view of the image provided by the second light guiding means 101B is the same size, shape, and direction, as the field of view of the image of the first light guiding means 101A. This can enable the image that is provided by the second light guiding means 101B to be the same size and shape as the image provided by the first light guiding means 101A.

In some examples the second light guiding means 101B could be different to the first light guiding means 101A. In some examples the first light guiding means 101A could comprise a different material or have a different thickness and/or size and/or shape and/or any other suitable characteristic compared to the second light guiding means 101B.

For instance, in some examples the second light guiding means 101B could be configured to have a smaller field of view as an output. In such examples the second light guiding means 101B can be configured to expand a part of the image. This part of the image can then overlay the corresponding part of the image provided by the first light guiding means 101A. Such configurations could be used to control the brightness of a part of the image.

The second light guiding means 101B can be rotated relative to the first light guiding means 101A. This rotation can ensure that the out-coupling diffractive means 107A of the first light guiding means 101A at least partially overlaps the out-coupling diffractive means 107B of the second light guiding means 101B. In the example shown in FIG. 2 the second light guiding means 101B is rotated 180° relative to the first light guiding means 101A. Other angles of rotation can be used depending on the relative configurations of the diffractive components of the respective light guiding means 101A, 101B.

Figure 3A:
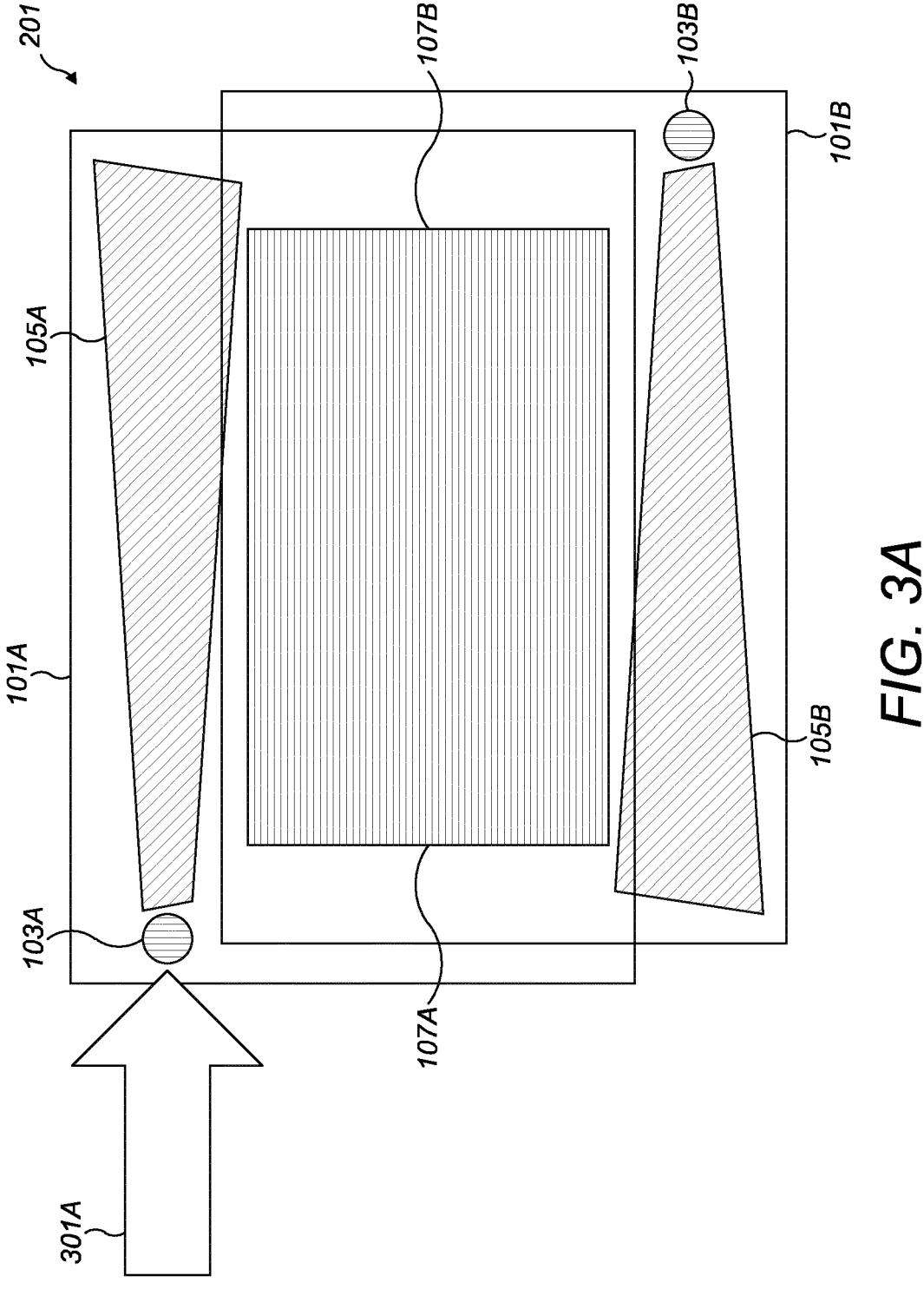
FIGS. 3A and 3B show an example apparatus in use.
Figure 3B:
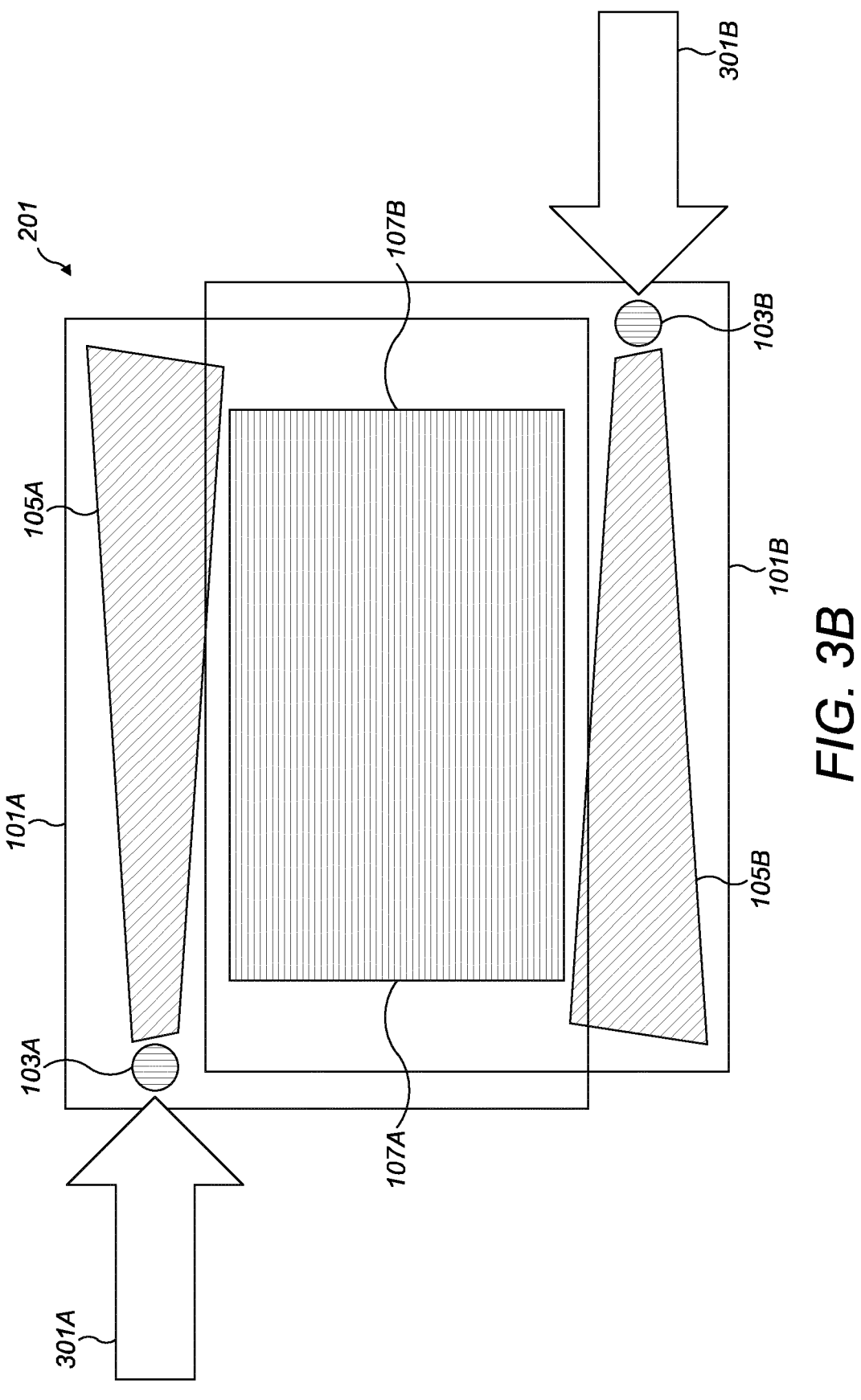

FIGS. 3A and 3B show the example apparatus 201 of FIG. 2 in use. FIG. 3A shows the apparatus 201 in a normal viewing mode and FIG. 3B shows the apparatus 201 in an increased brightness mode.

In the normal viewing mode as shown in FIG. 3A only the first light engine 301A is turned on. This allows light from the first light engine 301A to be in-coupled to the first light guiding means 101A so that an expanded exit pupil is provided by the first light guiding means 101A.

In this normal viewing mode the second light engine is not turned on. There is no light from the second light engine being in-coupled to the second light guiding means 101B. This means that there is no image provided by the second light guiding means 101B and the image that is provided by the apparatus 201 is comprised of just the image provided by the first light guiding means 101A.

In the increased brightness mode as shown in FIG. 3B both the first light engine 301A and the second light engine 301B are turned on. The second light engine 301B is configured to be switched between on and off states while the first light engine 301A remains on. The second light engine 301B can be operated independently of the first light engine 301A.

In the increased brightness mode light from the first light engine 301A is in-coupled to the first light guiding means 101A so that an expanded exit pupil is provided by the first light guiding means 101A and also light from the second light engine 301B is in-coupled to the second light guiding means 101B so that an expanded exit pupil is also provided by the second light guiding means 101B. The image provided by the second light guiding means 101B overlays the image provided by the first light guiding means 101A so that the composite image provide by the apparatus 201 has an increased brightness compared to the normal viewing mode.

The examples of FIGS. 3A and 3B therefore show that the second light engine 301B can be turned on to provide an image with increased brightness and turned off to provide a normal image with non-increased brightness. This therefore enables the brightness of images provided by the apparatus 201 to be controlled and therefore improves the dynamic range of the images.

In the example shown in FIG. 2 and FIGS. 3A to 3B the apparatus 201 comprises two light guiding means 101A, 101B. This provides at least two different brightness settings. It is to be appreciated that in other examples of the disclosure the apparatus 201 could comprise more than two light guiding means 101A, 101B. In such examples the plurality of light guiding means 101 can be provided in a stacked arrangement so that each of the out-coupling diffractive means are provided overlaying at least part of another outcoupling diffractive means.

Where there are more than two light guiding means 101 within an apparatus 201 each of the different light guiding means 101 can be coupled to a different light engine 301. Each of the light engines can be configured so that they can be operated independently of the other light engines 301. Having more than two different light guiding means 101 within a single apparatus 201 can enable a plurality of different brightness settings to be provided by the apparatus depending on which of the light guiding means 101 and corresponding light engines 301 and settings of the light engines 301 are used at any given time.

In some examples the more than two light guiding means 101 can be configured so that different parts of the images can be provided to have different brightness levels at different times. For instance a second light guiding means 101B could be configured to have an out-coupling diffractive means 107B that overlays a top half of the out-coupling diffractive means of the first light guiding means 101A and a third light guiding means could be configured to have an out-coupling diffractive means that overlays the lower half of the out-coupling diffractive means 107A of the first light guiding means 101A. This can enable the brightness of the upper half and lower half of the images provided by the apparatus 201 to be controlled independently of each other by controlling which of the light guiding means are used.

In other examples additional brightness settings could be provided by providing adjustable light engines 301A, 301B. in such examples, instead of light engines having binary settings that allow an on mode or an off mode the light engines 301A, 301B could have different brightness settings so as to provide a plurality of different brightness modes. In such examples the brightness of any of the light engines within the apparatus 201 could be controlled to control the brightness of images provided by the apparatus 201.

In some examples the apparatus 201 can be configured so that a user of the apparatus 201 can adjust the brightness of the images manually. For instance, the user could manually turn one or more light engines on or off so as to obtain a desired brightness setting.

In other examples the apparatus 201 could be configured so that the brightness of the images could be adjusted automatically. In such examples the apparatus 201 could comprise one or more means that are configured to detect a trigger event and control the brightness of the images provided by the apparatus 101 in response to the trigger event. In such examples the brightness of the images can be controlled without any further input from the user.

In some examples the apparatus 201 could comprise one or more sensors configured to detect the ambient level of illumination. The brightness of the images provided by the apparatus 201 could then be controlled based on the detected ambient level of illumination. For instance, if the ambient illumination level falls outside of a threshold range then the second light engine 301B or any other additional light engines could be turned on so as to provide a brighter image.

In other examples the brightness of the images provided by the apparatus 201 could be controlled based on a user indicated brightness level. In such examples the user could indicate their preferred brightness level and the brightness of the images could be adjusted based on the ambient light levels and the user's preferred brightness setting.

In some examples the brightness of the image could be adjusted based on the content of the image. The brightness of the image could be adjusted based on an assumed or assigned level of importance of content within the image. For instance, it could be determined whether or not an image comprises text. Text content could be assigned a higher importance level than non-text content and so the text could be provided with a higher brightness level that non-text content. In some examples the apparatus 201 could be configured so that only the text content or the portion of the image comprising the text content has the higher brightness level while the rest of the image has a lower or normal brightness level.

In some example the importance level of the content could be determined by information comprised within the content. For example, if the apparatus 201 is used in a head up display in a vehicle the image could comprise a warning indication or other information about the state of the vehicle. Such information could be considered to be of high importance and so could be displayed at a higher brightness level to ensure that it is clearly visible to a user. The increased brightness level could be applied to all of the image or to just the part of the image that shows the warning indication or other information of high importance.

FIG. 4 shows how the brightness of an output image of an apparatus 201 can vary depending on the different brightness settings of the light engines 301A, 301B associated with the different light guiding means 101A, 101B. The light engines 301A, 301B could be provided in an apparatus 201 as shown in FIGS. 2 to 3B or could be provided in any other suitable arrangement.

Figure 4A:
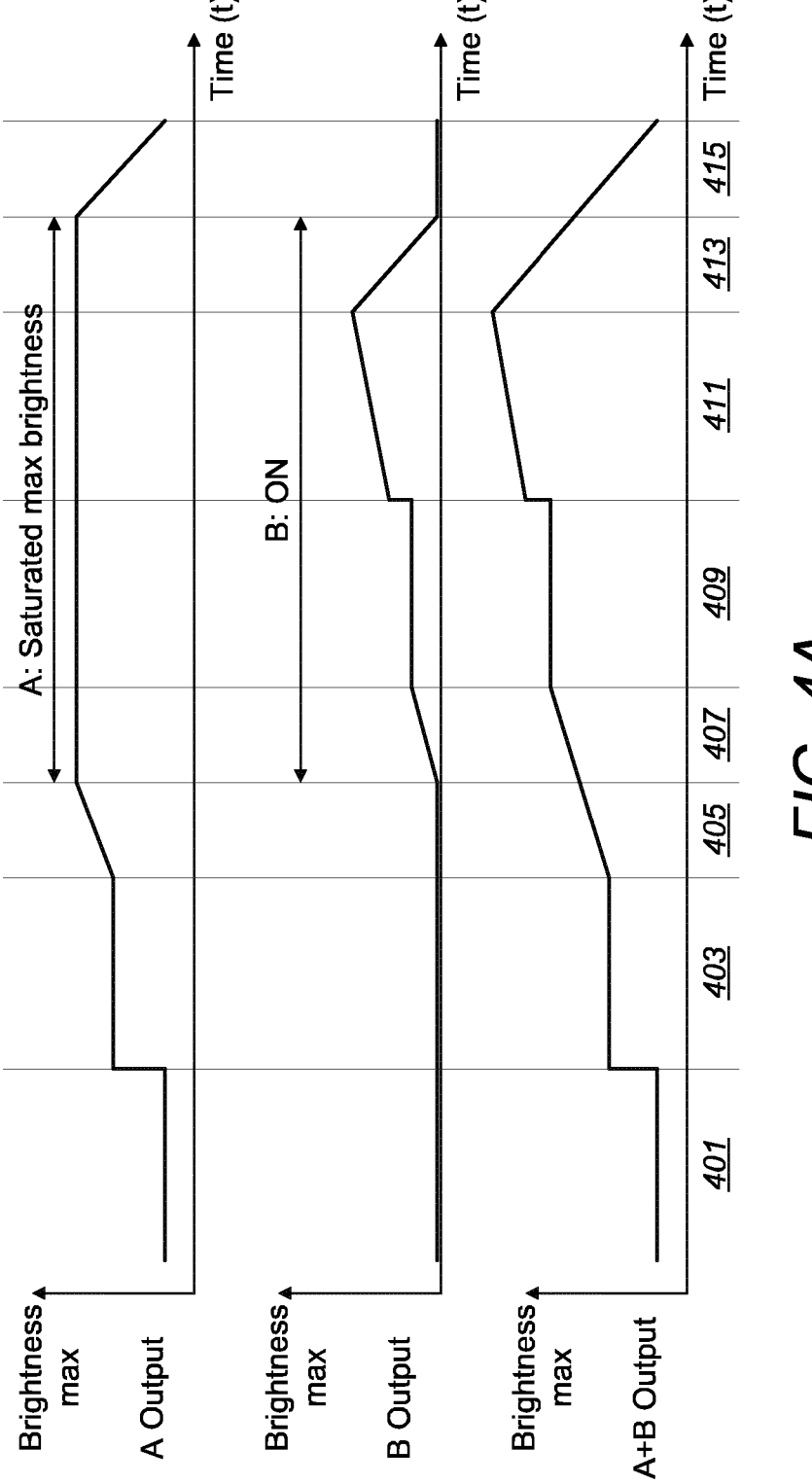
FIGS. 4A and 4B shows example modes of operation of an apparatus.
Figure 4B:
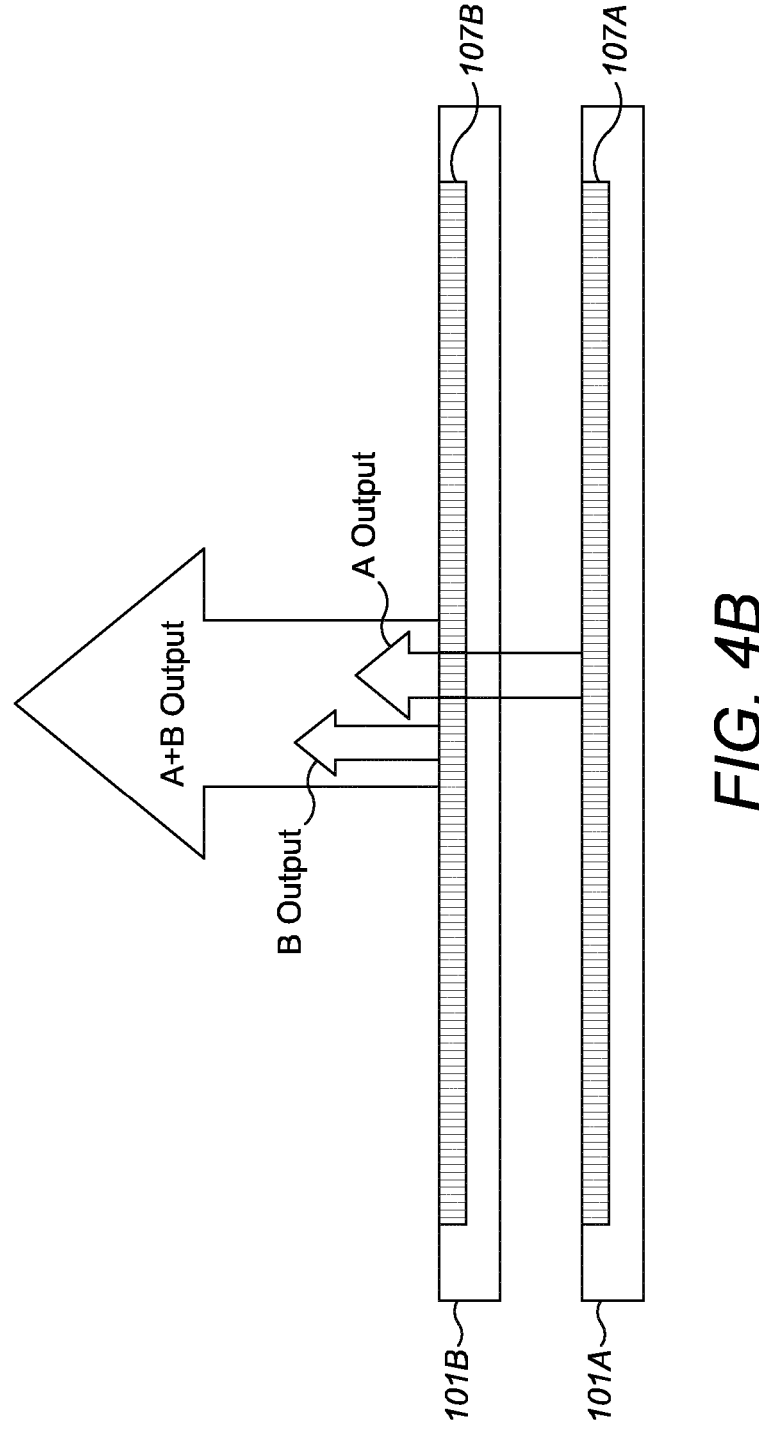

FIG. 4A shows three plots which show how brightness of the respective light engines 301A, 301B and the corresponding images vary over time. FIG. 4B shows how the output of the first light guiding means 101A and the output of the second light guiding means 101B combine to provide an output for the apparatus 201. In FIG. 4B only the outcoupling means 107A, 107B of the respective light guiding means 101A, 101B are shown.

In this example the outcoupling means 107A, 107B are the same size and shape and the apparatus 201 is configured so that the second outcoupling means 107B is positioned overlaying and aligned with the first outcoupling means 107A. Other arrangements and configurations of the respective light guiding means 107A, 107B could be used in other examples of the disclosure.

The top plot of FIG. 4A shows how the output brightness of the first light guiding means 101A varies. This could be due to variations in brightness of the first light engine 301A. The middle plot shows how the output brightness of the second light guiding means 101B varies. This could be due to variations in brightness of the second light engine 301B. The lower plot shows how the brightness of the output image of the apparatus 201 varies. The output image is the combination of the output brightness levels from the first light guiding means 101A and the second light guiding means 101B and so is dependent on the input brightness of both the first light guiding means 101A and the second light guiding means 101B.

At time 401 the first light engine 301A is turned on at a first brightness level. The second light engine 301B is not turned on at this time. The output for the combination of both the first light guiding means 101A and the second light guiding means 101B is determined by the brightness of the first light engine 301A because there is no contribution from the second light engine 301B.

At time 403 the brightness of the first light engine 301A is increased to a second brightness level. The second brightness level is brighter than the first brightness level. The increase in brightness could be in response to a change in light levels, a user input or any other suitable trigger event. The second light engine 301B is still not turned on at this time. The output for the combination of both the first light guiding means 101A and the second light guiding means 101B is still determined by the brightness of the first light engine 301A because there is no contribution from the second light engine 301B.

At time 405 the brightness of the first light engine 301A is gradually increased from the second brightness level to a third brightness level. The third brightness level is brighter than the second brightness level. The increase in brightness could be in response to a change in light levels, a user input or any other suitable trigger event. The second light engine 301B is still not turned on at this time. The output for the combination of both the first light guiding means 101A and the second light guiding means 101B is still determined by the brightness of the first light engine 301A because there is no contribution from the second light engine 301B.

At time 407 the brightness of the first light engine 301A remains at the third brightness level. The third brightness level could be a maximum saturated brightness level. This could be the maximum brightness level that can be achieved with the first light engine 301A. However, it may be determined that a further increase in brightness levels is needed. In order to obtain the further increase in brightness levels the second light engine 301B is turned on. The second light engine 301B is turned on so that the brightness level of the second light engine 301B increases from zero to a first brightness level. The output for the combination of both the first light guiding means 101A and the second light guiding means 101B is now determined by the brightness of the second light engine 301B in addition to the brightness of the first light engine 301A. This causes the brightness of the output image to increase over time 407 as the brightness of the second light engine 301B increases.

At time 409 the brightness of the first light engine 301A remains at the third brightness level and the brightness of the second light engine 301B remains at the first brightness level. This provides no change in the brightness of the output of the apparatus 201 during the time 409.

At time 411 the brightness of the first light engine 301A remains at the third brightness level and the brightness of the second light engine 301B gradually increases from the first brightness level to a second brightness level. This provides for a gradual increase in the brightness of the output of the apparatus 201 during the time 411.

At time 413 the brightness of the first light engine 301A remains at the third brightness level but the brightness of the second light engine 301B gradually decreases from the second brightness level to zero. This provides for a decrease in the brightness of the output of the apparatus 201 during the time 413. This decreases the brightness of the image back to the brightness that was provided at time 405 when only the first light engine 301A was turned on.

At time 415 the brightness of the first light engine 301A decreases from the third brightness level and the brightness of the second light engine 301B remains at zero. This provides for a decrease in the brightness of the output of the apparatus 201 during the time 415.

It is to be appreciated that the variations in brightness shown in FIG. 4 are examples and that other variations could be used in other examples of the disclosure.

10

Figure 5:
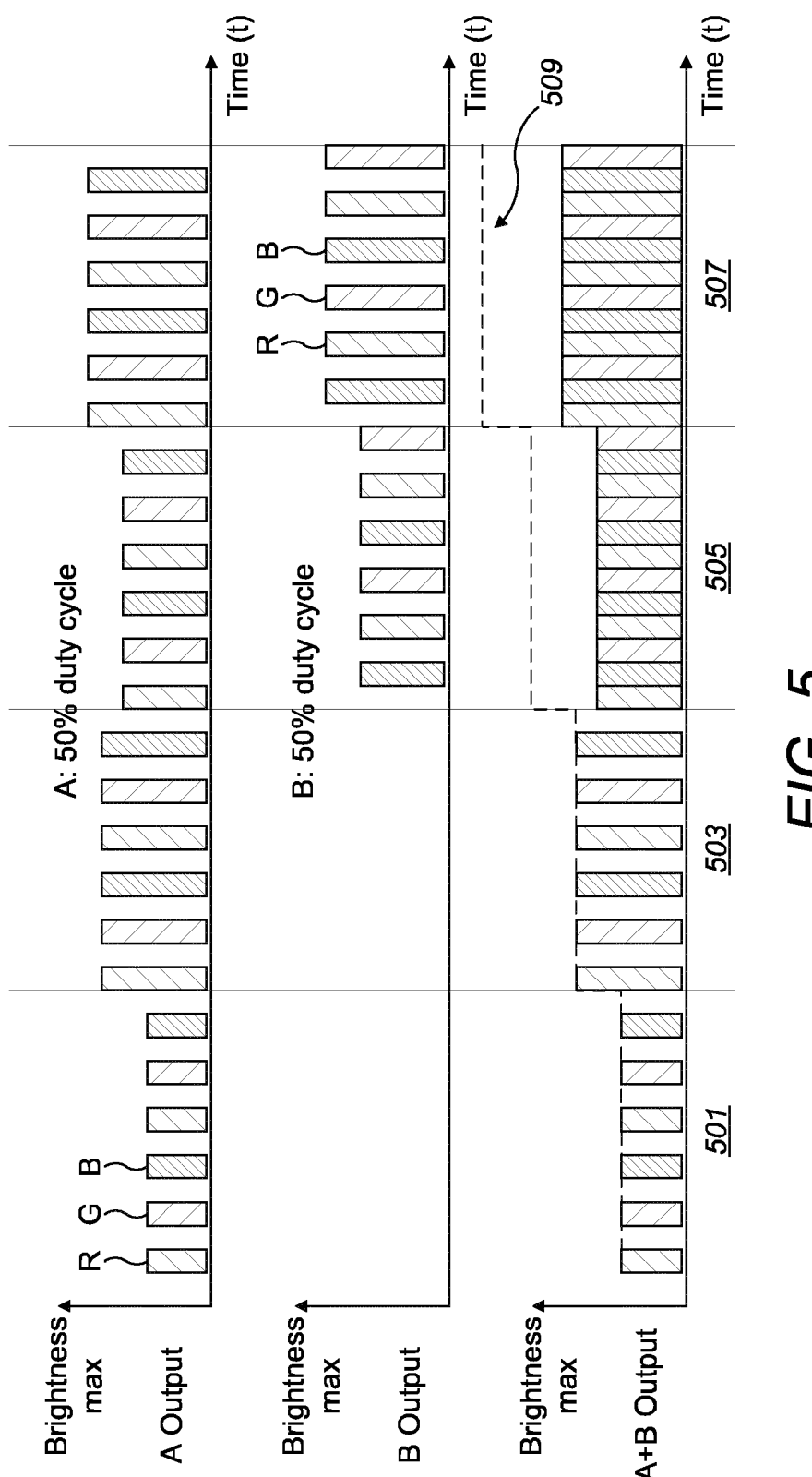
FIG. 5 shows example modes of operation of an apparatus.

FIG. 5 shows another example of how the brightness of an output image of an apparatus 201 can vary depending on the different brightness settings of the light engines 301A, 301B associated with the different light guiding means 101A, 101B. The light engines 301A, 301B could be provided in an apparatus 201 as shown in FIGS. 2 to 3B or could be provided in any other suitable arrangement. In this example the images provided are field sequential images so that different colour images are provided in a sequence.

FIG. 5 shows three plots which show how brightness of the respective light engines 301A, 301B and the corresponding images vary over time. The top plot shows how the output brightness of the first light guiding means 101A varies. This could be due to variations in brightness of the first light engine 301A. The middle plot shows how the output brightness of the second light guiding means 101B varies. This could be due to variations in brightness of the second light engine 301B. The lower plot shows how the brightness of the output image of the apparatus 201 varies. The output image is the combination of the outputs from the first light guiding means 101A and the second light guiding means 101B and so is dependent on the output brightness of both the first light guiding means 101A and the second light guiding means 101B. The dashed line 509 in the lower plot indicates the observed brightness of the images provided by the apparatus 201.

In this example the field sequential images are provided in the sequence red, green blue for both the first light engine 301A and the second light engine 301B. This is indicated by the labels R, G and B in FIG. 5. Only some of the blocks of the sequence are labelled in FIG. 5 to aid clarity. It is to be appreciated that other sequences could be used in other examples of the disclosure.

At time 501 the first light engine 301A is turned on at a first brightness level. The second light engine 301B is not turned on at this time. The output for the combination of both the first light guiding means 101 and the second light guiding means 101B is determined by the brightness of the first light engine 301A because there is no contribution from the second light engine 301B.

At time 503 the brightness of the first light engine 301A is increased to a second brightness level. The second brightness level is brighter than the first brightness level.

The increase in brightness could be in response to a change in light levels, a user output or any other suitable trigger event. The second light engine 301B is still not turned on at this time. The output for the combination of both the first light guiding means 101 and the second light guiding means 101B is still determined by the brightness of the first light engine 301A because there is no contribution from the second light engine 301B.

At time 505 the first light engine 301A is turned on at a third brightness level which is between the first brightness level and the second brightness level. The second light engine 301B is also turned on at the same brightness level. The field sequence of the second light engine 301B is timed so that the images for the second light engine 301B are provided in the time gaps between the images of the sequence for the first light engine 301A. The observed brightness comprises the contributions for both the first light engine 301A and the second light engine 301B and so is higher than that obtained by using just the first light engine 301A.

At time 507 the first light engine 301A is turned on at a fourth brightness level which is higher than any of the other brightness levels. The second light engine 301B is also turned on at the same brightness level. The observed brightness comprises the contributions for both the first light engine 301A and the second light engine 301B and so is higher than that obtained by using just the first light engine 301A and is even brighter that the observer level obtained at time 505.

It is to be appreciated that the variations in brightness shown in FIG. 5 are examples and that other variations could be used in other examples of the disclosure. For example when both light engines 301 are turned on, the brightness level of the first light engine 301A can be different compared to the brightness level of the second light engine 301B.

Figure 6:
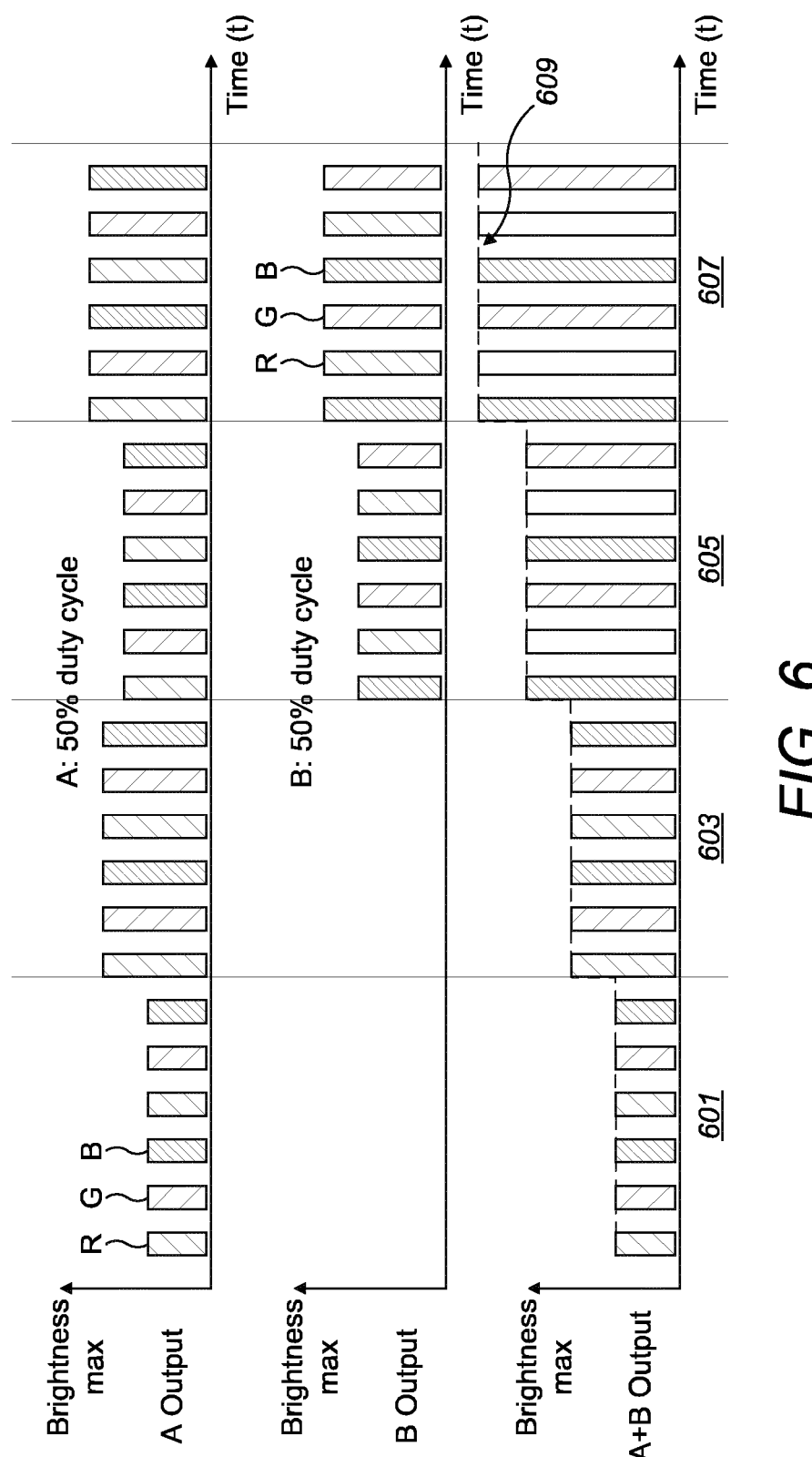
FIG. 6 shows example modes of operation of an apparatus.

FIG. 6 shows another example of how the brightness of an output image of an apparatus 201 can vary depending on the different brightness settings of the light engines 301A, 301B associated with the different light guiding means 101A, 101B. The light engines 301A, 301B could be provided in an apparatus 201 as shown in FIGS. 2 to 3B or could be provided in any other suitable arrangement. In this example the images provided are field sequential images so that different colour images are provided in a sequence.

FIG. 6 shows three plots which show how brightness of the respective light engines 301A, 301B and the corresponding images vary over time. The top plot shows how the output brightness of the first light guiding means 101A varies. This could be due to variations in brightness of the first light engine 301A. The middle plot shows how the output brightness of the second light guiding means 101B varies. This could be due to variations in brightness of the second light engine 301B. The lower plot shows how the brightness of the output image of the apparatus 201 varies. The output image is the combination of the outputs from the first light guiding means 101A and the second light guiding means 101B and so is dependent on the output brightness of both the first light guiding means 101A and the second light guiding means 101B. The dashed line 609 in the lower plot indicates the observed brightness of the images provided by the apparatus 201.

In this example the field sequential images are provided in the sequence red, green blue for both the first light engine 301A and the second light engine 301B. This is indicated by the labels R, G and B in FIG. 6. Only some of the blocks of the sequence are labelled in FIG. 6 to aid clarity. It is to be appreciated that other sequences could be used in other examples of the disclosure.

At time 601 the first light engine 301A is turned on at a first brightness level. The second light engine 301B is not turned on at this time. The output for the combination of both the first light guiding means 101A and the second light guiding means 101B is determined by the brightness of the first light engine 301A because there is no contribution from the second light engine 301B.

At time 603 the brightness of the first light engine 301A is increased to a second brightness level. The second brightness level is brighter than the first brightness level. The increase in brightness could be in response to a change in light levels, a user input or any other suitable trigger event. The second light engine 301B is still not turned on at this time. The output for the combination of both the first light guiding means 101A and the second light guiding means 101B is still determined by the brightness of the first light engine 301A because there is no contribution from the second light engine 301B.

At time 605 the first light engine 301A is turned on at a third brightness level which is between the first brightness level and the second brightness level. The second light engine 301B is also turned on at the same brightness level. The field sequence of the second light engine 301B is timed so that the images for the second light engine 301B are provided at the same time as the images of the sequence for the first light engine 301A. The respective sequences are timed so that when the first light engine 301A provides a blue image the second light engine 301B provides a green image, when the first light engine 301A provides a red image the second light engine 301B provides a blue image and when the first light engine 301A provides a green image the second light engine 301B provides a red image. This provides for improved colour in the output image, which can for example mean less distracting color breakup or rainbow effect observed by a user. The observed brightness comprises the contributions for both the first light engine 301A and the second light engine 301B and so is higher than that obtained by using just the first light engine 301A.

At time 607 the first light engine 301A is turned on at a fourth brightness level which is higher than any of the other brightness levels. The second light engine 301B is also turned on at the same brightness level. The observed brightness comprises the contributions for both the first light engine 301A and the second light engine 301B and so is higher than that obtained by using just the first light engine 301A and is even brighter that the observer level obtained at time 605.

Figure 7:
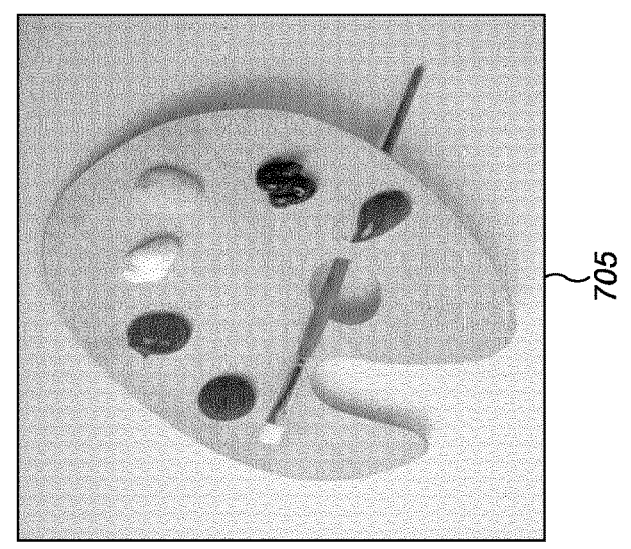
FIG. 7 shows example images obtained using examples of the disclosure.
Figure 7:
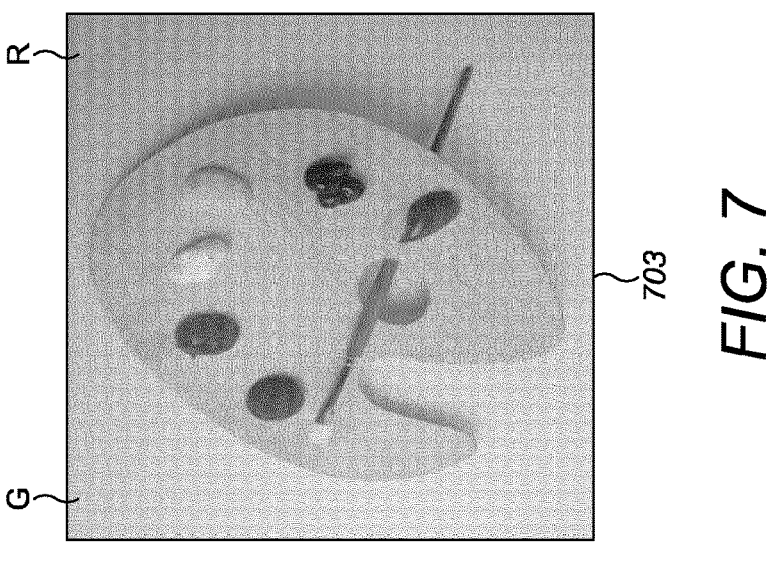
Figure 7:
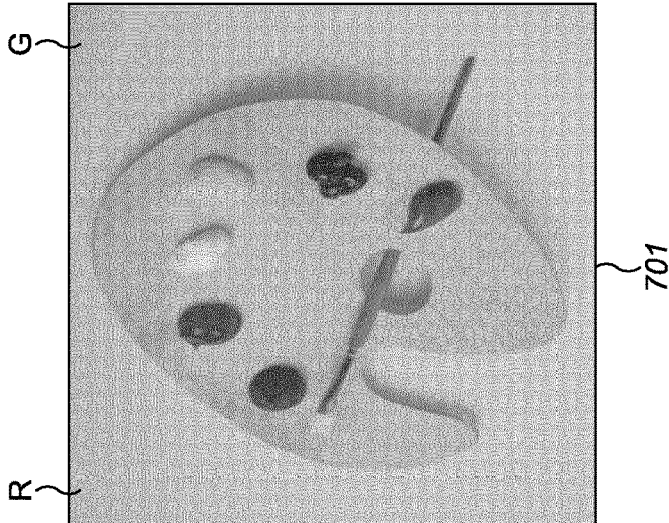

FIG. 7 shows an example image obtained using examples of the disclosure. The example images could be obtained using an apparatus 201 as shown in FIGS. 2 to 3B or could be provided in any other suitable arrangement.

The first image 701 shows an image that has been obtained by a first light guiding means 101A and the second image 703 shows an image that has been obtained by a second light guiding means 101B. Due to the arrangements of the diffractive means within the respective light guiding means 101A, 101B the images 701, 703 are non-uniform.

In the example of FIG. 7 the second light guiding means 101B is identical to the first light guiding means 101A but has been rotated through 180° and so the non-uniformity introduced into the images by the second light guiding means 101B is inverted compared to the non-uniformity introduced into the images provided by the first light guiding means 101A In FIG. 7 the first image 701 has a red tinge at the left hand side and a green tinge at the right hand side while the second image 703 has a red tinge at the right hand side and a green tinge at the left hand side. However when the two images are combined by the overlapping out-coupling means 107A, 107B the resultant image 705 has a more uniform colour output.

Therefore examples of the disclosure can provide for more uniform colour in the output images, in addition to providing a greater dynamic range. In order to provide for more uniform colour output the apparatus 201 could comprise an even number of light guiding means 101.

In this description the term coupled means operationally coupled. Any number or combination of intervening elements can exist between coupled components including no intervening elements.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. An apparatus, comprising:
a first light guide comprising at least a first in-coupling diffraction member configured to in-couple one or more first beams of light into the first light guide from a first light engine, a first expanding diffraction member configured to expand the one or more first beams of light along a horizontal direction, and a first out-coupling diffraction member positioned within the first light guide so that the one or more expanded first beams of light are provided from the first expanding diffraction member in the first light guide to the first out-coupling diffraction member in the first light guide that is configured to out-couple the one or more expanded first beams of light from the first light guide along a vertical direction, the first expanding diffraction member for the first light guide having a smaller side nearer the first in-coupling diffraction member for the first light guide and a start of a side of the first out-coupling diffraction member for the first light guide, and a larger side toward an end of the side of the first out-coupling diffraction member for the first light guide; and a second light guide comprising at least a second in-coupling diffraction member configured to in-couple one or more second beams of light into the second light guide from a second light engine, a second expanding diffraction member configured to expand the one or more second beams of light along the horizontal direction, and a second out-coupling diffraction member positioned within the second light guide so that the one or more expanded second beams of light are provided from the second expanding diffraction member in the second light guide to the second out-coupling diffraction member in the second light guide that is configured to out-couple the one or more expanded second beams of light from the second light guide along the vertical direction, the second expanding diffraction member for the second light guide having a smaller side nearer the second in-coupling diffraction member for the second light guide and a start of a side of the second out-coupling diffraction member for the second light guide, and a larger side toward an end of the side of the second out-coupling diffraction member for the second light guide;

wherein the apparatus is configured so that the first out-coupling diffraction member of the first light guide at least partially overlaps the second out-coupling diffraction member of the second light guide so that an image provided with the second light guide overlays an image provided with the first light guide to control at least brightness of one or more images provided with the apparatus; and wherein the first and second in-coupling diffraction members and corresponding first and second light expanding diffraction members are on opposite sides of the apparatus based on the vertical direction, and wherein the first and second in-coupling diffraction members are on opposite sides of the apparatus based on the horizontal direction.

2. An apparatus as claimed in claim 1 wherein the second light guide is substantially identical to the first light guide.

3. An apparatus as claimed in claim 2 wherein the second light guide is rotated relative to the first light guide.

4. An apparatus as claimed in claim 1 wherein the second light guide is a different size to a size of the first light guide.

5. An apparatus as claimed in claim 1 wherein, because of the at least partial overlap of the first and second out-coupling diffraction members, the second light engine provides an image with increased brightness when turned on and provides an image with non-increased brightness when turned off.

6. An apparatus as claimed in claim 5 wherein the apparatus is configured for automatically adjusting the brightness of an image provided with the apparatus using at least one of: a detected ambient level of illumination, a user indicated preferred brightness level, or an importance of displayed content.

7. An apparatus as claimed in claim 1 wherein the first and second light engines are configured so that the brightnesses of the first and second light engines are controlled to control the brightness of an image provided with the apparatus.

8. An apparatus as claimed in claim 1 wherein the second light engine is configured to be operated independently of the first light engine.

9. An apparatus as claimed in claim 1 wherein the second light engine is configured to be switched between an on state and an off state while the first light engine remains in an on state.

10. An apparatus as claimed in claim 1 wherein the second light engine is configured to provide light in an alternating sequence with the first light engine.

11. An apparatus as claimed in claim 1 wherein the first light engine provides an image and the second light engine provides part of the image so that addition of the part of the image from the second light guide increases contrast within the image provided with the first light guide.

12. An apparatus as claimed in claim 11 wherein the part of the image provided with the second light engine comprises one or more of: text or user interface elements.

13. An apparatus as claimed in claim 1 wherein the first light guide and the second light guide are different light guides and are configured so that the light out-coupled with the different light guides is at least partially polarised in a same way.

14. An apparatus as claimed in claim 1 comprising more than two light guides where the light guides comprise at least in-coupling diffraction members configured to in-couple one or more beams of light into the light guides from a light engine, expanding diffraction members configured to expand the one or more beams of light, and out-coupling diffraction members configured to out-couple the one or more expanded beams of light from the light guides and wherein the light guides are configured to in-couple light from a different light engine.

15. At least one of a module, a device, a display, a stereoscopic display, an auto stereoscopic display, a heads-up display, a display unit of a vehicle, or a vehicle comprising an apparatus as claimed in claim 1.

16. An apparatus, comprising:
a first light guiding means comprising at least a first in-coupling diffraction means configured to in-couple one or more first beams of light into the first light guiding means from a first light engine, a first expanding means configured to expand the one or more first beams of light along a horizontal direction, and a first out-coupling diffraction means positioned within the first light guiding means so that the one or more expanded first beams of light are provided from the first expanding means in the first light guiding means to the first out-coupling diffraction means in the first light guiding means that is configured to out-couple the one or more expanded first beams of light from the first light guiding means along a vertical direction, the first expanding means for the first light guiding means having a smaller side nearer the first in-coupling diffraction means for the first light guiding means and a start of a side of the first out-coupling diffraction means for the first light guiding means, and a larger side toward an end of the side of the first out-coupling diffraction means for the first light guiding means; and
a second light guiding means comprising at least a second in-coupling diffraction means configured to in-couple one or more second beams of light into the second light guiding means from a second light engine, a second expanding means configured to expand the one or more second beams of light along the horizontal direction, and a second out-coupling diffraction means positioned within the second light guiding means so that the one or more expanded second beams of light are provided from the second expanding means in the second light guiding means to the second out-coupling diffraction means in the second light guiding means that is configured to out-couple the one or more expanded second beams of light from the second light guiding means along the vertical direction, the second expanding means for the second light guiding means having a smaller side nearer the second in-coupling diffraction means for the second light guiding means and a start of a side of the second out-coupling diffraction means for the second light guiding means, and a larger side toward an end of the side of the second out-coupling diffraction means for the second light guiding means;
wherein the apparatus is configured so that the first out-coupling diffraction means of the first light guiding means at least partially overlaps the second out-coupling diffraction means of the second light guiding means so that an image provided by the second light guiding means overlays an image provided by the first light guiding means to control at least brightness of one or more images provided by the apparatus; and
wherein the first and second in-coupling diffraction means and corresponding first and second light expanding diffraction means are on opposite sides of the apparatus based on the vertical direction, and wherein the first and second in-coupling diffraction means are on opposite sides of the apparatus based on the horizontal direction.

\* \* \* \* \*